US006342001B1

United States Patent
Larson

(10) Patent No.: US 6,342,001 B1
(45) Date of Patent: Jan. 29, 2002

(54) SANDING BLOCK ATTACHMENT FOR A JIG SAW

(76) Inventor: Clarence M. Larson, 643 S. Glenhurst Dr., Anaheim, CA (US) 92808

( * ) Notice: Subject to any disclaimer, the term of this patent is extended or adjusted under 35 U.S.C. 154(b) by 41 days.

(21) Appl. No.: 09/591,127

(22) Filed: Jun. 10, 2000

(51) Int. Cl.7 ................................................ B24B 23/00
(52) U.S. Cl. ........................... 451/356; 30/122; 83/750; 451/415; 451/540; 451/559
(58) Field of Search ................. 451/356, 415, 451/540, 559; 7/158; 30/122; 83/749, 750

(56) References Cited

U.S. PATENT DOCUMENTS

| 3,914,906 A | * | 10/1975 | Barnes | |
| 3,950,896 A | * | 4/1976 | Ozero | |
| 4,128,970 A | * | 12/1978 | Sawrenko | |
| 4,707,947 A | | 11/1987 | Harris | 51/181 |
| 5,209,022 A | * | 5/1993 | McCambridge | |
| 5,658,193 A | * | 8/1997 | McCambridge | 451/356 |
| 6,149,510 A | * | 11/2000 | Romagnoli | 451/356 |

* cited by examiner

Primary Examiner—Timothy V. Eley
(74) Attorney, Agent, or Firm—Goldstein Law Offices, P.C.

(57) ABSTRACT

A sanding block attachment for a jig saw including a block portion adapted for securement to the reciprocating blade of the jig saw. The block portion has a generally rectangular configuration. The block portion is defined by a long front face, a long rear face, a short top face, a short bottom face, and long opposed side faces. A sheet of sandpaper is removably secured to the long front face of the block portion.

4 Claims, 2 Drawing Sheets

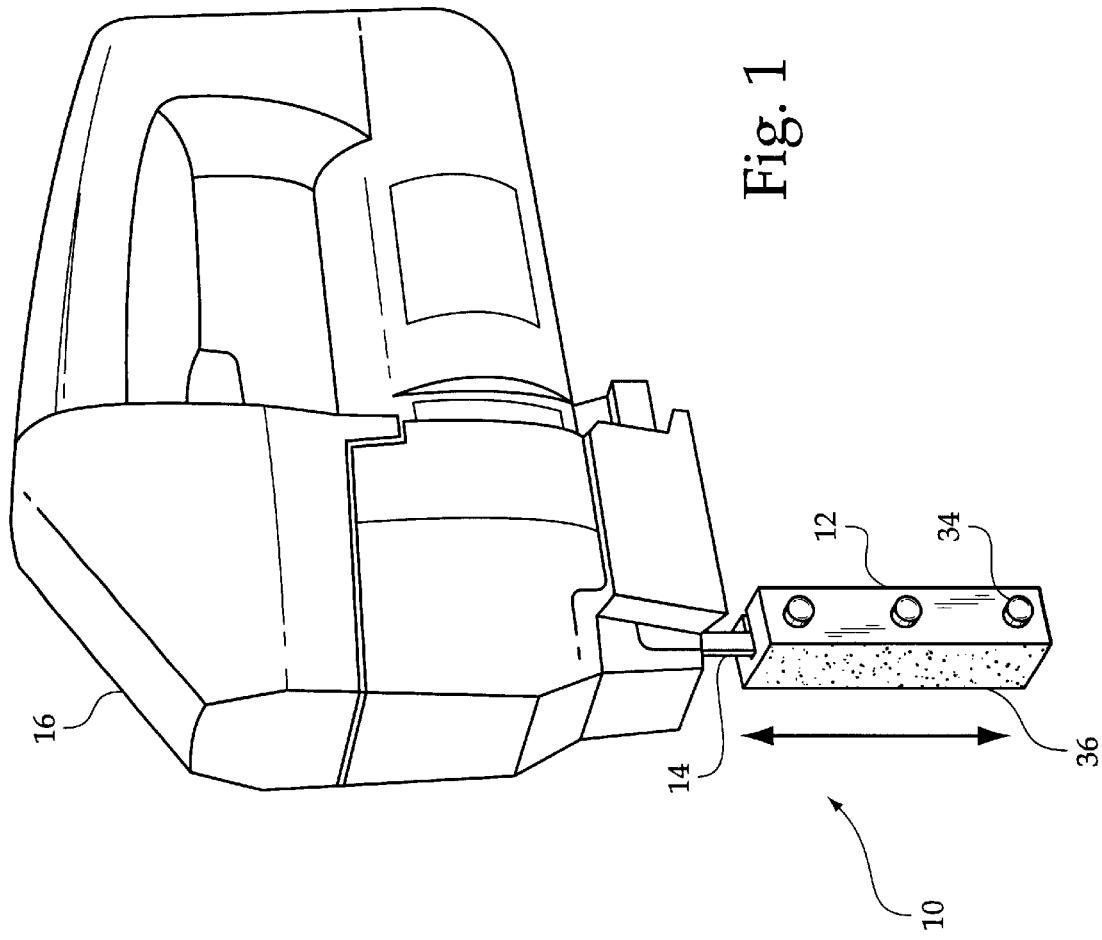

SANDING BLOCK ATTACHMENT FOR A JIG SAW

BACKGROUND OF THE INVENTION

The present invention relates to a sanding block attachment for a jig saw and more particularly pertains to attaching a sanding instrument to a reciprocating blade of a jig saw for sanding objects.

The use of power tool attachment devices is known in the prior art. More specifically, power tool attachment devices heretofore devised and utilized for the purpose of attaching to power tools to provide additional usages are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,914,906 to Barnes discloses a sanding sheet capable of being attached to the blade of a reciprocating saw for reaching hard to reach places utilizing adhesive for securement. U.S. Pat. No. 4,707,947 to Harris discloses a sharpening stone attachment for a jig saw. U.S. Pat. No. 3,950,896 to Ozero discloses a sanding attachment for a jig saw.

While these devices fulfill their respective, particular objective and requirements, the aforementioned patents do not describe a sanding block attachment for a jig saw for attaching a sanding instrument to a reciprocating blade of a jig saw for sanding objects.

In this respect, the sanding block attachment for a jig saw according the to present invention substantially departs from the conventional concepts and designs of the prior art, and in doing so provides an apparatus primarily developed for the purpose of attaching a sanding instrument to a reciprocating blade of a jig saw for sanding objects.

Therefore, it can be appreciated that there exists a continuing need for a new and improved sanding block attachment for a jig saw which can be used for attaching a sanding instrument to a reciprocating blade of a jig saw for sanding objects. In this regard, the present invention substantially fulfills this need.

SUMMARY OF THE INVENTION

In the view of the foregoing disadvantages inherent in the known types of power tool attachment devices now present in the prior art, the present invention provides an improved sanding block attachment for a jig saw. As such, the general purpose of the present invention, which will be described subsequently in greater detail, is to provide a new and improved sanding block attachment for a jig saw which has all the advantages of-the prior art and none of the disadvantages.

To attain this, the present invention essentially comprises a block portion adapted for securement to the reciprocating blade of the jig saw. The block portion has a generally rectangular configuration. The block portion is defined by a long front face, a long rear face, a short top face, a short bottom face, and long opposed side faces. The long rear face has a longitudinal slot formed therein. The slot is dimensioned for receiving the reciprocating blade therein. One of the long opposed side faces has a plurality of threaded apertures therein. The apertures have inner ends in communication with the longitudinal slot. The apertures removably receive set screws therein whereby the set screws will extend within the longitudinal slot for engaging the reciprocating blade. A sheet of sandpaper is removably secured to the long front face of the block portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sanding block attachment for a jig saw which has all the advantages of the prior art power tool attachment devices and none of the disadvantages.

It is a other object of the present invention to provide a new and improved sanding block attachment for a jig saw which may be easily and efficiently manufactured and marketed.

It is a further object of the present invention to provide a new and improved sanding block attachment for a jig saw which is of durable and reliable construction.

An even further object of the present invention is to provide a new and improved sanding block attachment for a jig saw which is susceptible of a low cost of manufacture with regard to both materials and labor, and which accordingly is then susceptible of low prices of sale to the consuming public, thereby making such a sanding block attachment for a jig saw economically available to the buying public.

Even still another object of the present invention is to provide a new and improved sanding block attachment for a jig saw for attaching a sanding instrument to a reciprocating blade of a jig saw for sanding objects.

Lastly, it is an object of the present invention to provide a new and improved sanding block attachment for a jig saw including a block portion adapted for securement to the reciprocating blade of the jig saw. The block portion has a generally rectangular configuration. The block portion is defined by a long front face, a long rear face, a short top face, a short bottom face, and long opposed side faces. A sheet of sandpaper is removably secured to the long front face of the block portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the sanding block attachment for a jig saw constructed in accordance with the principles of the present invention.

The same reference numerals refer to the same parts through the various figures.

DESCRIPTION OF THE PREFERRED EMBODIMENTS

Figure 4:
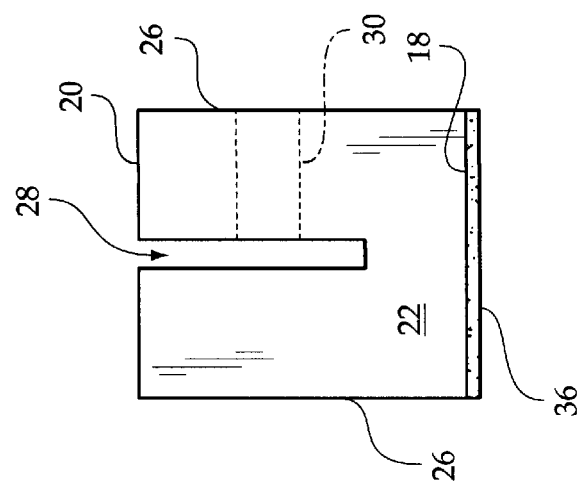
FIG. 4 is a top plan view of the present invention.
Figure 3:
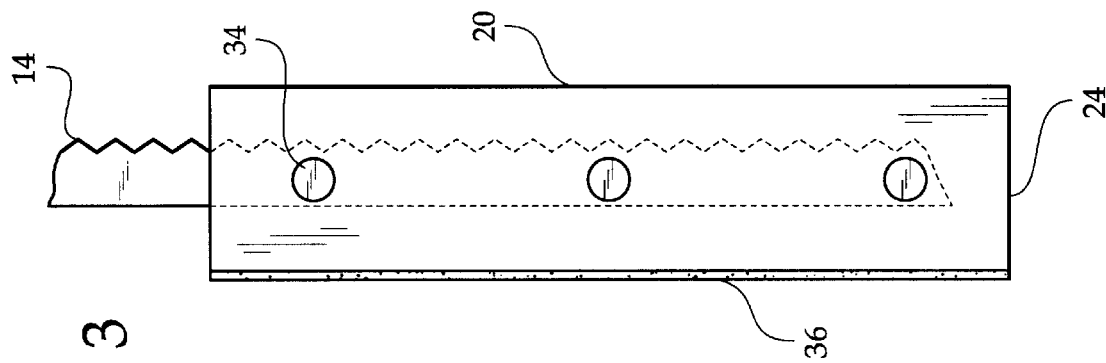
FIG. 3 is a side view of the present invention illustrated secured to the saw blade.
Figure 2:
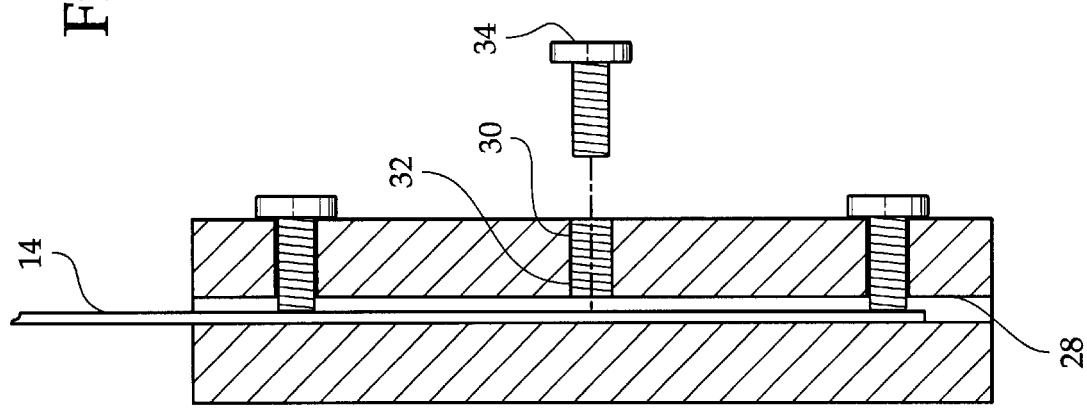
FIG. 2 is a rear view of the present invention illustrated secured to the saw blade.

With reference now to the drawings, and in particular, to FIGS. 1 through 4 thereof, the preferred embodiment of the new and improved sanding block attachment for a jig saw embodying the principles and concepts of the present invention and generally designated by the reference number 10 will be described.

Specifically, it will be noted in the various Figures that the device relates to a sanding block attachment for a jig saw for attaching a sanding instrument to a reciprocating blade of a jig saw for sanding objects. In its broadest context, the device consists of a block portion and a sheet of sandpaper. Such components are individually configured and correlated with respect to each other so as to attain the desired objective.

The block portion 12 is adapted for securement to the reciprocating blade 14 of the jig saw 16. The block portion 12 has a generally rectangular configuration. The block portion 12 is defined by a long front face 18, a long rear face 20, a short top face 22, a short bottom face 24, and long opposed side faces 26. The long rear face 20 has a longitudinal slot 28 formed therein. The slot 28 is dimensioned for receiving the reciprocating blade 14 therein. One of the long opposed side faces 26 has a plurality of threaded apertures 30 therein. The apertures 30 have inner ends 32 in communication with the longitudinal slot 26. The apertures 30 removably receive set screws 34 therein whereby the set screws 34 will extend within the longitudinal slot 28 for engaging the reciprocating blade 14.

The sheet of sandpaper 36 is removably secured to the long front face 18 of the block portion 12.

In use, the block portion 12 will be secured to the reciprocating blade 14 by positioning the blade 14 within the longitudinal slot 28 and then tightening the set screws 34. The jig saw 16 can then be activated and maneuvered so as to position the sand paper 36 on a particular area or object to be sanded.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sanding block attachment for a jig saw for attaching a sanding instrument to a reciprocating blade of a jig saw for sanding objects comprising, in combination:

a block portion adapted for securement to the reciprocating blade of the jig saw, the block portion having a generally rectangular configuration, the block portion being defined by a long front face, a long rear face, a short top face, a short bottom face, and long opposed side faces; and a sheet of sandpaper removably secured to the long front face of the block portion.

2. The sanding block attachment for a jig saw as set forth in claim 1, wherein the long rear face of the block portion has a longitudinal slot formed therein, the slot being dimensioned for receiving the reciprocating blade therein.

3. The sanding block attachment for a jig saw as set forth in claim 2, wherein one of the long opposed side faces of the block portion has at least one threaded aperture therein, the at least one aperture having inner ends in communication with the longitudinal slot, the apertures removably receiving set screws therein whereby the set screws will extend within the longitudinal slot for engaging the reciprocating blade.

4. A sanding block attachment for a jig saw for attaching a sanding instrument to a reciprocating blade of a jig saw for sanding objects comprising, in combination:

a block portion adapted for securement to the reciprocating blade of the jig saw, the block portion having a generally rectangular configuration, the block portion being defined by a long front face, a long rear face, a short top face, a short bottom face, and long opposed side faces, the long rear face having a longitudinal slot formed therein, the slot being dimensioned for receiving the reciprocating blade therein, one of the long opposed side faces having a plurality of threaded apertures therein, the apertures having inner ends in communication with the longitudinal slot, the apertures removably receiving set screws, whereby the set screws extend into the longitudinal slot for engaging the reciprocating blade; and a sheet of sandpaper removably secured to the long front face of the block portion.

* * * * *